(12) United States Patent
Xu et al.

(10) Patent No.: US 11,526,714 B2
(45) Date of Patent: Dec. 13, 2022

(54) METHOD AND APPARATUS FOR ANISOTROPICALLY MODIFYING TEXT ATTRIBUTES TO COMPLY WITH A RESOLUTION LIMIT

(71) Applicant: ESKO Software BVBA, Ghent (BE)

(72) Inventors: Neil Xu, Shanghai (CN); Kristiaan K. A. Van Bael, Sint-Laureins (BE)

(73) Assignee: ESKO Software BV

( * ) Notice: Subject to any disclaimer, the term of this patent is extended or adjusted under 35 U.S.C. 154(b) by 0 days.

(21) Appl. No.: 17/055,826

(22) PCT Filed: Jun. 3, 2019

(86) PCT No.: PCT/EP2019/064252
§ 371 (c)(1),
(2) Date: Nov. 16, 2020

(87) PCT Pub. No.: WO2019/233906
PCT Pub. Date: Dec. 12, 2019

(65) Prior Publication Data
US 2021/0209430 A1    Jul. 8, 2021

(30) Foreign Application Priority Data
Jun. 5, 2018    (CN) .......................... 201810569451.5

(51) Int. Cl.
*G06K 15/02*    (2006.01)
(52) U.S. Cl.
CPC ..... *G06K 15/1847* (2013.01); *G06K 15/1839* (2013.01)
(58) Field of Classification Search
CPC .................. G06K 15/1847; G06K 15/1839
See application file for complete search history.

(56) References Cited

U.S. PATENT DOCUMENTS 5,754,187 A * 5/1998 Ristow .................... G06K 15/02
345/472
6,130,667 A * 10/2000 Hasegawa .............. G06K 15/02
345/470
(Continued)

FOREIGN PATENT DOCUMENTS

EP    534622 A2 *  3/1993  ........... G06T 11/203
EP    2410487 A1 *  1/2012  ........... G06T 11/203

OTHER PUBLICATIONS

International Preliminary Report on Patentability for International Application No. PCT/EP2019/064252, dated Dec. 8, 2020, 6 pages.
(Continued)

*Primary Examiner* — Ted W Barnes
(74) *Attorney, Agent, or Firm* — RatnerPrestia

(57) ABSTRACT

A computer implemented method for proofing a selected part of a graphical data input file for output to an output device by automatically adjusting at least one graphics feature in the input file to compensate for a predetermined resolution limit. The method includes identifying one or more portions in the selected part of the input file having an initial thickness less than the resolution limit, determining a set of optimal anisotropic offset parameters that will bring the one or more portions above the predetermined resolution limit with a minimal total offset value, applying an offset using the anisotropic offset parameters to modify the selected part of the input file to give the one or more portions an adjusted thickness greater than the initial thickness, and creating an output file comprising the at least one graphics feature having the adjusted thickness.

23 Claims, 4 Drawing Sheets

(56) References Cited

U.S. PATENT DOCUMENTS

| | | | | |
|---|---|---|---|---|
| 6,498,608 | B1* | 12/2002 | Dresevic | G06F 40/109 |
| | | | | 382/242 |
| 7,639,258 | B1* | 12/2009 | Dowling | G06F 40/126 |
| | | | | 345/643 |
| 8,648,862 | B2* | 2/2014 | Schildermans | G06T 11/203 |
| | | | | 101/2 |
| 2003/0234791 | A1* | 12/2003 | Boyd | G06T 15/04 |
| | | | | 345/582 |
| 2004/0227770 | A1* | 11/2004 | Dowling | G06T 11/203 |
| | | | | 345/611 |
| 2005/0219247 | A1* | 10/2005 | Arnold | G06F 40/126 |
| | | | | 345/467 |
| 2005/0219248 | A1* | 10/2005 | Arnold | G06T 11/203 |
| | | | | 345/467 |
| 2006/0017733 | A1* | 1/2006 | Matskewich | G09G 5/246 |
| | | | | 345/467 |
| 2007/0030272 | A1* | 2/2007 | Dowling | G06T 11/20 |
| | | | | 345/467 |
| 2007/0188497 | A1* | 8/2007 | Dowling | G09G 5/24 |
| | | | | 345/469 |
| 2012/0019552 | A1* | 1/2012 | Schildermans | G06T 11/203 |
| | | | | 345/619 |

OTHER PUBLICATIONS

International Search Report and Written Opinion for International Application PCT/EP2019/064252, dated Sep. 27, 2019, 8 pages.
European Communication pursuant to Article 94(3) for European Application No. 19 729 670.0, dated Nov. 26, 2021, 4 pages.

* cited by examiner

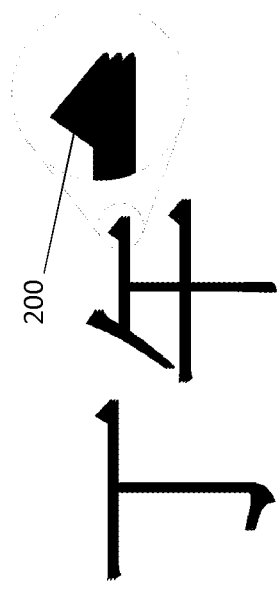
FIG. 2A
(PRIOR ART)
FIG. 2B
(PRIOR ART)
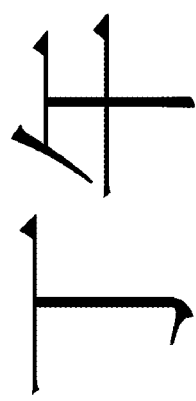
FIG. 1
(PRIOR ART)
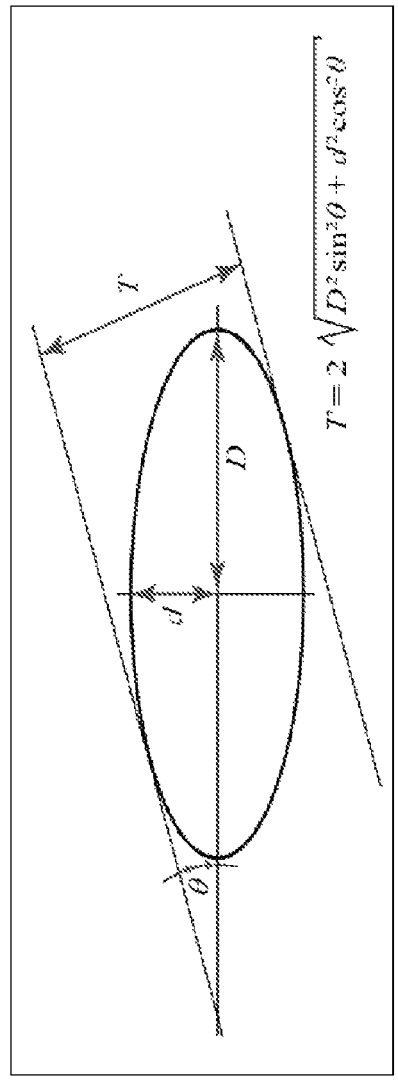
FIG. 6
(PRIOR ART)

METHOD AND APPARATUS FOR ANISOTROPICALLY MODIFYING TEXT ATTRIBUTES TO COMPLY WITH A RESOLUTION LIMIT

CROSS-REFERENCE TO RELATED APPLICATIONS

This application is a U.S. National Phase of PCT Application No. PCT/EP2019/064252, filed Jun. 3, 2019, which claims priority to Chinese Application No. 201810569451.5, titled METHOD AND APPARATUS FOR ANISOTROPICALLY MODIFYING TEXT ATTRIBUTES TO COMPLY WITH A RESOLUTION LIMIT, filed Jun. 5, 2018, incorporated herein by reference in its entirety.

BACKGROUND OF THE INVENTION

In printing, it can be challenge to produce thin lines. Usually, there is a minimum thickness for line to be printed in a stable and reliable way. For gravure, a typical value is 50-100 microns (depending on the engraver and printing press). If digital artwork has lines that are thinner, there is a risk that they will not be imaged on the printing plate and/or not transferred to the substrate.

Text can have many thin lines, especially if the point size is small and or the typeface uses thin strokes. If some of these lines are not printed reliably, then the text can easily become hard or impossible to read. A missing stroke can even change the meaning of the text. For example: "1-2 tablets per day" can become "12 tablets per day."

Some typefaces also have very thin ornamental features (such as serifs). If these smaller parts are not reproduced reliably, the text is still be perfectly readable, providing some tolerance for the thinnest of attributes on a page not to reproduce perfectly in certain circumstances.

The problem can happen both with Western and Asian fonts, especially when there is a drastic contrast of thickness between the strokes in different directions. For example, the horizontal lines in the Chinese characters depicted in FIG. 1 are much thinner than the vertical lines. Asian typefaces like Ming typeface (Japan) and Song (Chinese) are widely used for printing. With western text, "Serif" style of typefaces also feature variable stroke thickness.

Furthermore, it is also possible that the minimum stable thickness of a line depends on the direction of that line. With Flexographic printing, for example, a thin line that is imaged parallel with the printing cylinder can suffer from different artifacts than a line that runs along the printing direction.

There exist many ways to avoid or reduce this problem, already. In most cases the digital artwork is modified to make the problematic strokes thicker. In one approach, the pre-press operator uses manual tools to fixing these printing issues, but they can be time consuming and not perfect. One of the manual ways of solving the issue is for the operator to stack multiple copies of the same text on top of each other, with a small vertical offset, such as is depicted in the before and after illustrations in FIGS. 2A and 2B, respectively. While this method make the horizontal strokes appear thicker without modifying the thickness of the vertical strokes, it creates a lot of work for the operator and may causes some artifacts 200 at the end of the stroke. Furthermore, the operator must perform careful measurements to prevent thickening the stroke more than the necessary.

There are also some automated tools for addressing this problem. The ThinParts™ tool, which is part of the Desk-Pack™ software product distributed by Esko Software BVBA, the assignee of this invention, detects the thinnest part from the text and makes a new stroke on top of the thinnest part of stroke at exactly the minimum line thickness. Similar methods are generally described in U.S. Pat. No. 8,648,862, titled "METHOD FOR AUTOMATICALLY MODIFYING A GRAPHICS FEATURE TO COMPLY WITH A RESOLUTION LIMIT," granted to the assignee of the present invention, and incorporated herein by reference. This method eliminates the manual measurement work and avoids over thickening. But one drawback is that the added strokes may break the visual integrity of the typeface. Accordingly, text with the added strokes may look unbalanced and may not resemble the original typeface.

The HQH Pro software distributed by HELL Gravure System can also fix thin lines in text. In this solution, the digital artwork is first rasterized into a pixel image, then an algorithm is used for improving the line thickness, before sending the image to the gravure device. That solution is not optimal for typefaces like Song/Ming with non-event vertical/horizontal strokes on average, because everything is offset.

SUMMARY OF THE INVENTION

One aspect of the invention comprises a method for proofing at least a selected part of a graphical data input file for output to an output device. The method comprises automatically adjusting, using a computer programmed to perform such adjusting, at least one graphics feature, such as a text character or a portion thereof, in the input file to compensate for a predetermined resolution limit. The method comprises automatically identifying with the computer one or more portions of the selected part of the input file having an initial thickness less than the predetermined resolution limit, then automatically determining a set of optimal anisotropic offset parameters that when applied will bring at least a selected percentage of the one or more portions above the predetermined resolution limit with a minimal total offset value. The selected part of the input file is automatically modified with the computer by applying an offset using the identified set of optimal anisotropic offset parameters so that at least the identified one or more portions has an adjusted thickness greater than the initial thickness. Then the computer creates output file comprising the at least one graphics feature having the adjusted thickness. The selected part of the input file may comprise a plurality of strokes, wherein the one or more portions comprises fewer than all the plurality of strokes, and in which the step of automatically modifying comprises applying the offset to all of the plurality strokes in the selected part of the input file, not just to the one or more portions identified as having the initial thickness less than the predetermined resolution limit.

The step of automatically determining the set of optimal anisotropic offset parameters may comprise analyzing the results of a skeletonization operation, which may include the steps building a 2 dimensional histogram representing stroke direction divided into 180/n direction intervals of n degrees each, and k weight intervals equally dividing a range between 0 and the predetermined resolution limit, with a value of each cell in the interval comprising a total stroke length for the identified part of the file having the stroke direction and weight defined by the cell. Then, the analysis may comprise iteratively testing a plurality of offset conditions until a total stroke length represented by a sum of all cells in the histogram is less than or equal to a predetermined percentage of a total stroke length of all strokes in the identified part. The offset may be applied by modifying or adding vector artwork to the one or more portions. The at least one graphics feature may comprise a non-Latin text character and the selected part of the file may comprise one or more digital characters representing text having a common size and a common typeface.

The method may further comprise storing in the computer, in association with the graphics feature, information identifying the adjustments made to compensate for the predetermined resolution limit for that graphics feature in a first instance, and using the stored information when encountering the same graphics feature in a second instance. The selected part may comprise one or more digital characters representing a font set in which case storing the information identifying the adjustments may comprise storing a modified font set. The information identifying the adjustments may be stored in short term computer memory storage, and the first and second instances may be encountered when processing a single input file or multiple input files associated with a single project. The information identifying adjustments may also be stored in long term computer memory storage, wherein the first and second instances relate to first and second input files processed for use in connection with the output device.

The offset may be applied to a rasterized version of the text. The identification of the selected part of the input file having the at least one graphics feature and/or the predetermined resolution limit may be received as user inputs. The predetermined resolution limit may be a user-imposed limit or may be defined by an output device having a lower resolution limit than a resolution limit of the input file.

Another aspect of the invention comprises a system for proofing at least a selected part of a graphical data input file for output to an output device. The system is configured for automatically adjusting at least one graphics feature to compensate for a predetermined resolution limit. The system includes a controller comprising a processor having a memory programmed with instructions for performing the method steps as described herein. The system may further comprise the output device, such as a printer, a printing plate maker, or a cutter connected to the controller.

Yet another aspect of the invention comprises non-transitory computer readable media including program instructions for proofing at least a selected part of a graphical data input file for output to an output device, the instructions programmed for automatically adjusting at least one graphics feature in the input file to compensate for a predetermined resolution limit. The program instructions when executed by a processor cause the processor to perform the method steps as described herein.

BRIEF DESCRIPTION OF THE DRAWINGS

FIG. 1 illustrates a set of exemplary Chinese text characters having different stroke lengths for horizontal versus vertical strokes.

FIG. 2A illustrates a set of exemplary Chinese text characters in need of line thickening.

FIG. 2B illustrates the set of Chinese text characters of FIG. 2A after application of an exemplary prior art thickening process.

FIG. 6 depicts the geometry of an ellipse and equations pertaining thereto.

DETAILED DESCRIPTION OF THE INVENTION

One aspect of the invention improves readability of printed text by applying a path offset operation to digital artwork. One benefit of an offset operation is that it can be equally applied to all characters of the text, and so it better preserves the balance and visual consistency of the typeface as compared to other types of solutions. Furthermore, in a preferred embodiment, the offset operation is anisotropic, meaning that the offset distance may be different in each direction. Use of an anisotropic offset was found to be very effective on serif and Ming typefaces, in particular.

Figures 5A, 5B:
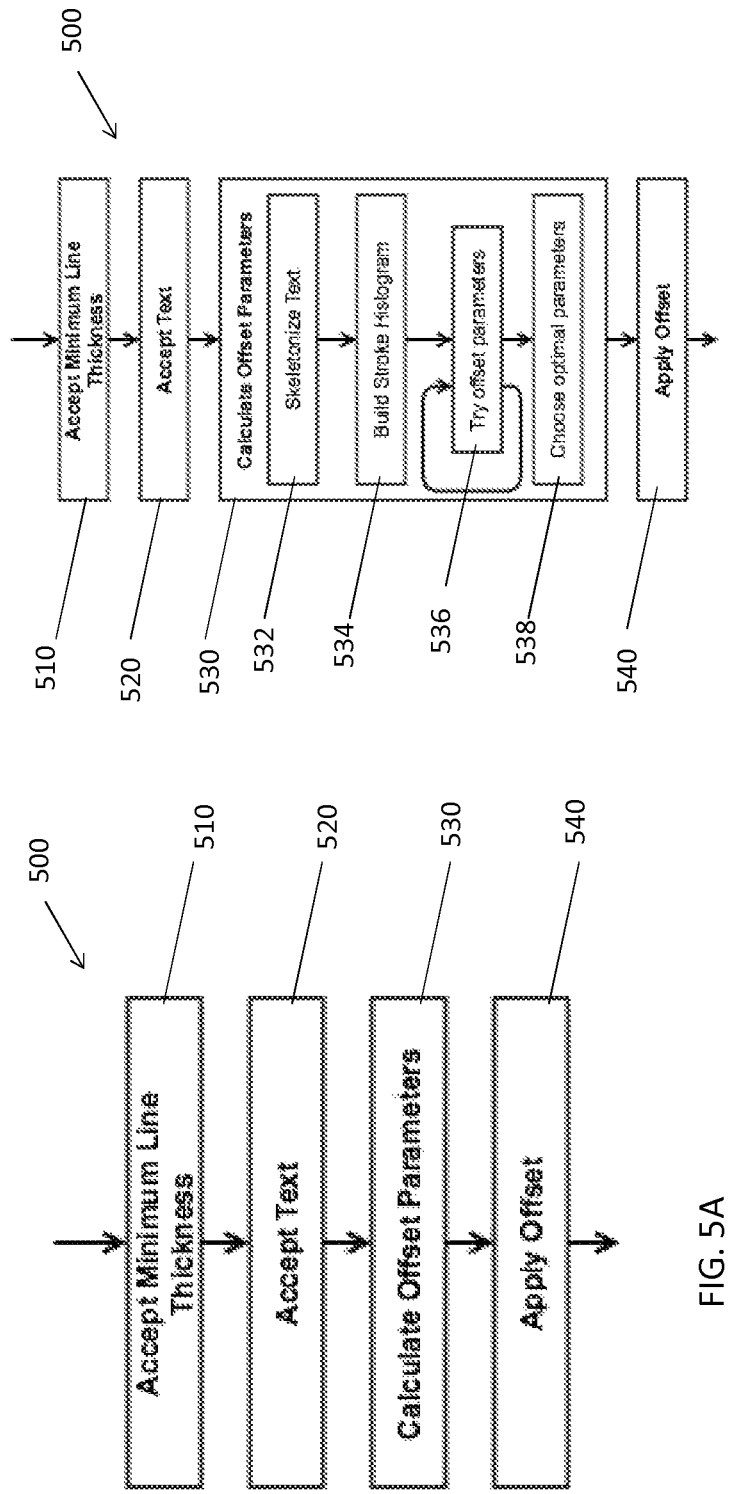
FIG. 5A is a flowchart depicting an exemplary line thickening method in accordance with the invention.
FIG. 5B is a flowchart depicting the exemplary line thickening method of FIG. 5B in more detail.

The parameters for the offset are automatically calculated in such a way as to make the text readable after printing, but with as little as possible change made to the text. The general flow of an exemplary method 500 is depicted in FIG. 5A, and in more detail in FIG. 5B. In general, after a minimum line thickness is established and accepted 510, a user selects a part of the vector artwork representing text (further referred to as just "text") and accepts it for analysis. Then, the optimal offset parameters are calculated 530 based upon analysis of the shape of the text, and the offset operation is applied to the text 540 using the optimal offset parameters.

Offsetting a Path

Figure 4A:
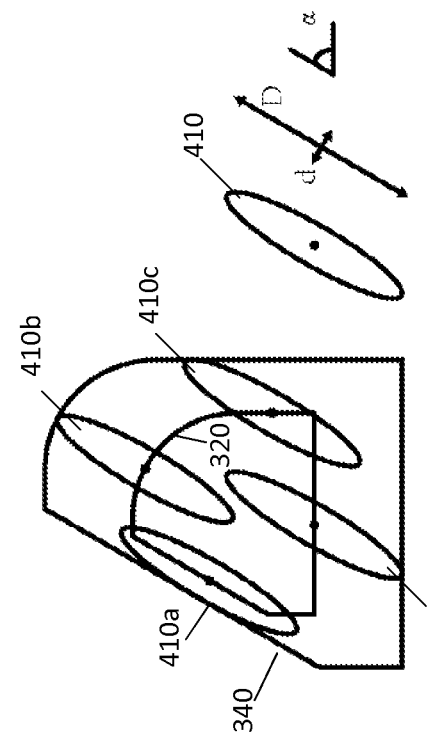
FIG. 4A illustrates an anisotropic offset process applied to the same shape depicted in FIG. 3A.
Figure 3A:
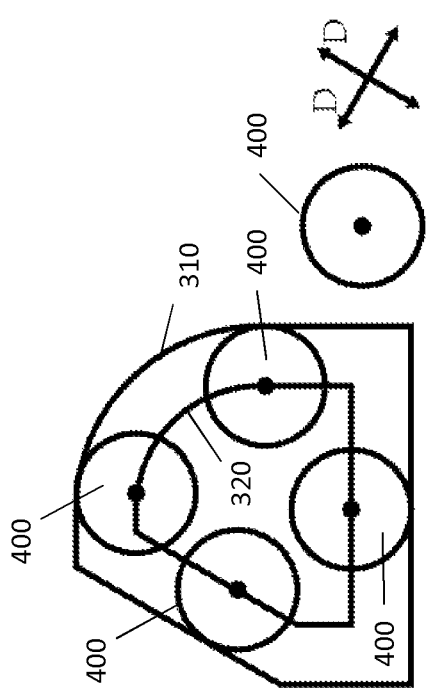
FIG. 3A illustrates a prior art regular offset process applied to a shape.

Path offset is a well-known operation, and used extensively in computer graphics, for example when having to render a spline curve with a given stroke thickness. The resulting path is a fixed distance away from the original path. For example, as shown in FIG. 3A, the outer boundary 310 of shape 300 offset a fixed distance from the inner boundary 320. The fixed distance can be expressed as depicted in FIG. 4A, as a distance that is ½ the diameter D of a circle 400 centered on the inner boundary line. Thus, each arrow, arrow 315 in FIG. 3A represents D/2 as depicted in FIG. 4A. Sharp corners are often treated differently, based on the user preference, such as by using a "miter join" algorithm during the offset generation step to preserve the sharpness of the corner, which is common in the graphic arts industry and well documented elsewhere, and not discussed in detail herein.

Figure 4B:
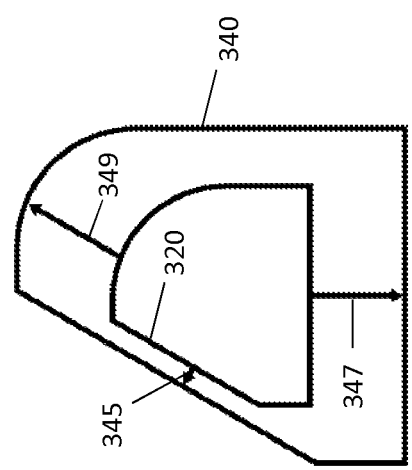
FIG. 4B illustrates a visualization of the anisotropic offset process applied in FIG. 4A.
Figure 3B:
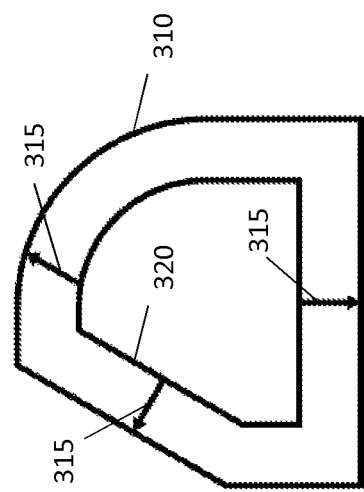
FIG. 3B illustrates a visualization of the regular offset process applied in FIG. 3A.

An anistropic path offset, depicted in FIGS. 3B and 4B, is very similar to regular offset, except that the distance of the new path to the original path is dependent on the direction, in the same way that an ellipse has a different thickness, depending on the direction in it is measured. Whereas a regular offset, like a circle, has 1 parameter (the distance D), an anisotropic offset operation has 3 parameters, like an ellipse: the offset distance in the major diameter direction (D), the angle of the main direction ($\alpha$) and the offset distance (d) in the minor diameter direction perpendicular to D, where D>d. Thus, a regular path offset can also be expressed using the equations for applying the anisotropic offset, with D=d. An offset in just one direction is a special case of an anisotropic offset. Thus, as shown in FIG. 3B, providing an anisotropic offset can be expressed as applying ellipses 410a-410d to the same inner boundary 320 of FIG. 3A, which produces an outer boundary 340 that is very different than outer boundary 310, and which results in different thickness of each stroke of the character, depending upon the stroke direction, as depicted by the different lengths of arrows 345, 347 and 349. As depicted in FIG. 6, the length of a tangent T to an ellipse can be expressed by Equation 1:

$$T = 2*\text{sqrt}(D^2 \sin^2\theta + d^2 \cos^2\theta) \quad (1)$$

So, in the same way as the ellipse, we can describe how the thickness of a line at an angle would change, as a result of an anistropic offset with parameters D, d, α and β, where α=the applied angle of the ellipse relative to horizontal, and β=the angle of the line to be offset relative to horizontal.

$$\text{New line thickness} = \textit{old} \text{ line thickness} + 2*\text{sqrt}(D^2 \sin^2(\alpha-\beta) + d^2 \cos^2(\alpha-\beta)) \quad (2)$$

Thus, when the line is parallel to the direction of the main offset (i.e. α=β), the thickness will increase by 2d (which is the least) When the line is perpendicular to the direction of the main offset (i.e. α=(β±90), its thickness will increase by 2D (which is the most).

Stroke Thickness-Direction Histogram

To calculate the offset parameters in step 520 by applying an anisotropic offset, the method includes first performing a skeletonization operation 532 on the text, which operation is well-known in computational topology (and also described and illustrated in U.S. Pat. No. 8,648,862, already incorporated herein by reference). The result is an alternative representation of the text: A set of strokes with a total length of L, with each stroke having a direction and thickness that can vary along the length of the stroke. Next a two dimensional histogram of stroke thickness versus stroke direction is compiled, in step 534. For example, in the exemplary embodiment described herein, the stroke direction may be divided into 36 direction intervals of 5 degrees, or more generically 180/n direction intervals of n degrees, defining the columns of the histogram. The stroke thickness is divided into 25 weight intervals, or more generically k intervals, equally dividing the range between 0 and the minimum line thickness. These weight intervals define the rows of the histogram. An exemplary histogram is depicted below as HISTOGRAM 1, with only the first and last two rows and columns depicted with data. The value in a cell of the histogram represents the total length of all stroke parts that fall within the given direction interval and given weight interval of that cell. All parts of strokes that are thicker than the minimum line thickness are not included in the histogram.

| HISTOGRAM 1 | | | | | |
|---|---|---|---|---|---|
|  | 0 ... 5° | 5 ... 10° | ... | 170 ... 175° | 175.-180° |
| 48 ... 50 m | 0.321 mm | 0 | ... | 0.142 mm | 0.372 mm |
| 46 ... 48 m | 0 | 0.253 mm | ... | 0.328 mm | 0.003 mm |
| . | . | . | . | . | . |
| . | . | . | . | . | . |
| . | . | . | . | . | . |
| 2 ... 4 m | 0 | 0.003 mm | ... | 0 | 0.015 mm |
| 0 ... 2 m | 0.021 mm | 0.001 mm | ... | 0.021 mm | 0.007 mm |

L0 is defined as the sum of values of the histogram cells (i.e. the total length of stroke parts that are thinner than the minimum line thickness). If the L0 is less than 1% of L (where L=the total stroke length), no further offset is deemed necessary. Otherwise, the analysis continues.

Simulate Anisotropic Offset on the Histogram

For given offset parameters (D,d,α), Formula 2 is used for evaluating every histogram cell, if the stroke parts represented by that cell are still below the minimum line width. Function L(D,d,α) is defined as the sum of values of the cells in the histogram that, according to Formula 2, are still below the minimum line width. Exemplary HISTOGRAM 2 is depicted below, again with only the first and last two rows and columns of data shown, along with a row that shows the offset associated with each column as calculated using the applied offset values (D,d,α).

| HISTOGRAM 2 | | | | | |
|---|---|---|---|---|---|
|  | 0 ... 5° | 5 ... 10° | ... | 170 ... 175° | 175 ... 180° |
| 48 ... 50 m | 0.321 mm | 0 | ... | 0.142 mm | 0.372 mm |
| 46 ... 48 m | 0 | 0.253 mm | ... | 0.328 mm | 0.003 mm |
| 44 ... 46 m | 0.182 | 0.123 mm | ... | 0 | 0.014 mm |
| 2 ... 4 m | 0 | 0.003 mm | ... | 0 | 0.015 mm |
| 0 ... 2 m | 0.021 mm | 0.001 mm | ... | 0.021 mm | 0.007 mm |
| Offset: | +4.1 m | +3.8 m | ... | +3.9 m | +4.2 m |

Thus, for an offset with parameters (D,d,α) as defined in this particular example, the result of Formula 2 is shown in the bottom row, showing for each angle how much a stroke will be thickened. That offset value, along the intervals in the left column, can be used to determine if all the strokes that are represented in a cell will become thick enough (at or above a minimum threshold for line thickness) or if some or all of them remain below the minimum line thickness. L(D,d,α) is the sum of the cells below the minimum line thickness, representing the total length of strokes still below the minimum stroke thickness after applying the offset. Different values of (D, d, α) are iteratively tried in step 536 until an optimal set of parameters is found. For example, in one embodiment, the optimal set of parameters is defined as the set of parameters that solves Equation 3:

$$L(D,d,\alpha) \leq TV*L \quad (3)$$

For multiple values of D,d that satisfy the equation, the set having the lowest value for D+d is selected. This ensures the overwhelming majority of the text strokes are above the minimum line thickness. Because text can also contain ornamental features (e.g. serifs) that are not critical for readability, a tolerance value TV of 1% (0.01) is applied in the exemplary embodiment, but the invention is not limited to a particular tolerance value, or to the application of any tolerance value. What results is essentially a three dimensional optimization problem. There are many different ways of solving such problems. In one embodiment, an exhaustive search using discrete values for D, d and α (equivalent to the intervals of the histogram) may be run.

The foregoing describes just one possible way to find the optimal anisotropic offset parameters. Many approaches are possible. For example, in a pixel-based approach, the following steps may be performed:
 (a) Rasterize the text into a black & white pixel image (black text on white background)
 (b) Define a run as a horizontal or vertical row of consecutive black pixels, bounded by a white pixel on either side. Optionally, more than 2 directions can be considered by repeating the steps above with a rotated version of the text.
 (c) For each direction (horizontal and vertical), determine the minimum offset ($O_h$ and $O_v$) required to make 95% of the runs at least as long as the minimum line thickness.
 (d) Proceed with anisotropic offset parameters ($O_h$, $O_v$, 0) or ($O_v$, $O_h$, 90).

In yet another example, a brute force approach may be performed by considering a set of combinations of offset parameters. For example:
 (a) Select D and d ranging from 0 to half the minimum line thickness, in X (e.g. 5) steps, with α=a limited number of angles (e.g. 0 or 90 degrees).
 (b) Remove invalid and equivalent combinations. For example, X=5 and α=0 or 90, yields 25 combinations of offset parameters.
 (c) Automatically try these combinations one by one (in ascending order of D+d), by offsetting the path.
 (d) For every attempt, calculate total length of strokes below the minimum line thickness (e.g. based on skeleton analysis).
 (e) Repeat (a)-(d) until a combination is found at which no more than 5% of stroke length is below the minimum line thickness.

Once optimal offset parameters have been selected, the next step is to apply the offset to the text. There are many ways to modify the digital artwork to achieve this effect. For example:
 (A) Replace the original text artwork by new closed paths, as calculated by the offset algorithm.
 (B) Add new closed paths, representing the difference between the text and the offset text.
 (C) Rasterize the text and apply the offset to the pixel image (e.g. with a convolution operation).
 (D) Assign stroke attributes to the vector artwork. For an even offset, this is trivial, but the vector file format may also support anisotropic offsets. For example, in a PDF document, this can be performed by combining a stroke with multiple transformations.
 (E) Attach the offset parameters as metadata to the artwork, and perform the convolution operation during the raster image processing (RIP) phase.
 (F) Apply the offset on the font used by the text. For example, all (or a subset of) the glyphs in a font may be analyzed to determine the optimal offset parameters (for a given point size and minimum line width), and a variant of that font created with the offset glyphs.

It should be understood that the inverse problem may also be considered, wherein the space between two text-features is smaller than the minimum resolution, resulting in (for example) two parallel lines that are so close together that they risk printing as a single line. When evaluating the path offset, shape analysis may be performed on the inverse of the text, to assess the damage that the (positive) offset might have on the space between the text. The methods applied herein can thus be applied to the inverse of the text features, using the same principles. For example:
 1. Skeletonize both the text and the space in between the text
 2. Build two stroke histograms: one for the text, one for the space
 3. Try different offset parameters, and evaluate the impact on both histograms (the text strokes will get wider, the space strokes will get narrower)
 4. Define $L(D,d,\alpha)$ as the total length of text strokes below the minimal thickness and $S(D,d,\alpha)$ as the total length of space strokes below the minimal thickness (both after applying an offset with parameters $(D,d,\alpha)$).
 5. Finding optimal values for $(D,d,\alpha)$ where $L(D,d,\alpha)+S(D,d,\alpha) \leq TV*L$ and D+d is minimal. If not possible, then find optimal values for $(D,d,\alpha)$ where $L(D,d,\alpha)+S(D,d,\alpha)$ is as small as possible.
 6. Apply with optimal parameters.

Figure 7:
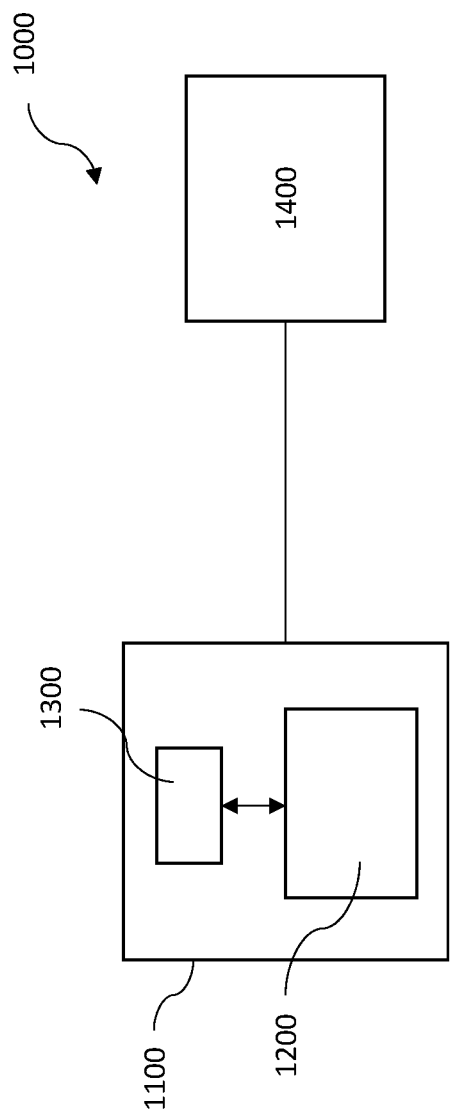
FIG. 7 is a schematic diagram of an exemplary system for proofing at least a selected part of a graphical data input file for output to an output device.

Throughout this application, the term "output device" such as output device 1400 (FIG. 7) shall mean any device that may be associated with processing a graphical object in a graphics file for its intended use, such as a display for displaying the graphical object, a printer for printing the graphical object, a plate maker for making a printing plate that is later used to print the graphical object, or a cutter for cutting material in a shape corresponding to the graphical object. Although described based on embodiments as examples, the invention is not limited to these examples.

It is well understood in the art that there are any number of ways to express the computerized instructions readable by a computer, such as controller 1100 comprising processor 1200 (FIG. 7), to generate the output corresponding a graphics file. The invention is not specific to any particular way of expressing the instructions, nor does this disclosure describe in detail how these instructions are formatted, stored (such as in memory 1300 in FIG. 7) or processed by output devices 1400 (FIG. 7), all of which is well understood by those of skill in the art and well documented in the literature. Regardless of how the various graphical objects are expressed by the corresponding software for generating such objects or in the stored instructions (e.g. in memory 1300) used for instructing the software, it is well understood that each graphical object corresponds to instructions executable by a computer such as controller 1100 comprising processor 1200, to produce a tangible result, whether that result constitutes a display, a printed page, a printing plate, a cut sheet of material, or any other type of output. Numerous systems, such as system 1000 (FIG. 7), already exist for interpreting these computerized instructions into formats used by editors to manipulate the graphical objects expressed by those instructions. The invention is not limited to any particular system for interpreting or editing such instructions. Rather, the invention relates to ways in which existing editors can process the informational data associated with graphical objects to modify portions of those objects in accordance with certain predefined rules.

Specifically, embodiments of the present invention include methods for detecting and fixing thin parts of selected graphical objects. The method for such detection and fixing of graphical objects may be applied to the entire file, or to a portion of the file selected automatically or selected by a user, such as a user highlighting a portion of a display viewable via a user interface. Computerized algorithms for selecting portions of graphics files using a user interface are well known in the art. The graphical objects may be represented by one or more contour paths that define an outline, which may be filled or unfilled. For graphical objects stored in a format that does not include defining the outlines of the objects, a preliminary method step may comprise converting the graphical object to an outline format. Computerized processes for making such conversions are already well known in the art.

A first step in an exemplary embodiment comprises reviewing selected graphical objects and evaluating them to determine whether all parts of the objects meet predetermined criteria. The predetermined criteria may include a threshold thickness corresponding to a resolution limit. Anything below the threshold thickness is characterized herein as a "thin" portion. The resolution limit may be a predetermined limit corresponding to the capabilities of the output device or may be a user-defined limit. Additional criteria may be used to identify thin portions that are subject to correction or that should not be corrected. Regardless of the specific criteria, in general the various embodiments of the invention comprising identifying portions of graphical objects that are too thin and subsequently thickening them to comply with a defined resolution limit.

In a preferred embodiment of the invention, the target graphical objects comprise text characters, such as but not limited to Latin and non-Latin characters, such as Asian or Arabic characters. These text characters may contain many thin parts which can give undesired results on a gravure press. It should be understood, however, that embodiments of the invention are not limited to text characters, any particular type of text characters, or any particular type of output device or technology, and that embodiments of the invention may be used to detect and modify graphical objects of all types.

The invention is not limited to any particular algorithm for generating skeletons or any particular type of skeletons corresponding to graphical objects.

The method steps as described herein may further include sending the output file with the modified features to an output device for further processing, such as printing, displaying, making a printing, plate, or cutting.

The output file comprising the modified graphical objects may comprise one or more layers. In one exemplary embodiment, a first layer may comprise the graphical objects prior to thin portion identification and modification, and a second layer may comprise only the modifications to the thin portions. Such an embodiment may permit a user to see the modifications as compared to the original via a user interface and make additional manual adjustments, if desired. For example, various criteria are discussed below for determining the portions of the graphics features to be adjusted. A user may run one set of criteria, inspect the modifications as compared to the original using those criteria, and then decide to apply additional or different criteria. The criteria may be applied to the entire graphics file, or to sub-sections of the file as selected by the user. The user may even be able to select a single graphics feature for application of selected criteria. Saving the modifications in a separate layer permits easy identification of the modifications for later review.

In some exemplary embodiments of the present invention, the characteristics of the modified graphical object, for example the characteristics of text character in a particular font, may be stored for future use, such as part of a font file. For example, the method steps described herein may be performed on a particular font set so that every time the system encounters the identified characters in that font, the previously stored information may be accessed, thereby bypassing the need to repeatedly perform the method each time the same character is encountered. This storage of the modified graphical object corresponding to a certain input graphical object may be long term storage in which the system saves this information for future use in connection the same graphical features encountered in different projects relating to a particular output device, for example, or it may be short term storage in which the information is saved only for use within the same file or for use in connection with a single project corresponding to multiple files.

Finally, it is understood by one of skill in the art, that embodiments of the present invention relate not just to methods for carrying out the aforementioned steps, such as with a computer or other processor, but also to systems for executing the methods, including such printers or processors. For example, the method may be performed by a processor programmed with instructions corresponding to the method steps described herein. Embodiments of the invention also include computer readable media including program instructions, which when executed by a processor, cause the processor to perform the method steps, as well as processors so programmed. Additional embodiments comprise systems that include such programmed processors and output devices connected thereto for receiving the output files and creating an output corresponding to that file.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for proofing at least a selected part of a graphical data input file for output to an output device, the method comprising automatically adjusting, using a computer programmed to perform such adjusting, at least one graphics feature in the input file to compensate for a predetermined resolution limit, the method comprising the steps of:
    (a) automatically identifying, using the computer, in the selected part of the input file, one or more portions having an initial thickness less than the predetermined resolution limit;
    (b) automatically determining a set of optimal anisotropic path offset parameters that when applied will bring the one or more portions above the predetermined resolution limit with a minimal total offset value;
    (c) automatically modifying with the computer the selected part of the input file so that the identified one or more portions have an adjusted thickness greater than the initial thickness, said modifying comprising applying an offset using the identified set of optimal anisotropic path offset parameters; and
    (d) creating, using the computer, an output file comprising the at least one graphics feature having the adjusted thickness;
        wherein the step of applying an offset using the identified set of optimal anisotropic path offset parameters can be expressed as applying one or more ellipses to the selected part of the input file, each of the one or more ellipses having an offset distance (D) in a major diameter direction, another offset distance (d) in a minor diameter direction that is perpendicular to the major diameter direction, and an angle (a) of the major diameter direction relative to a lateral direction, wherein D>d.

2. The method of claim 1, wherein the step of automatically determining a set of optimal anisotropic offset parameters comprises analyzing the results of a skeletonization operation.

3. The method of claim 1, wherein the offset is applied by modifying or adding vector artwork.

4. The method of claim 1, wherein the at least one graphics feature comprises a text character or a portion thereof.

5. The method of claim 4, wherein the at least one graphics feature comprises a non-Latin text character.

6. The method of claim 4, wherein the selected part comprises one or more digital characters representing text having a common size and a common typeface.

7. The method of claim 1, wherein the method further comprises storing in the computer, in association with the graphics feature, information identifying the adjustments made to compensate for the predetermined resolution limit for that graphics feature in a first instance, and using the stored information when encountering the same graphics feature in a second instance.

8. The method of claim 7, wherein the selected part comprises one or more digital characters representing a font set and storing the information identifying the adjustments comprises storing a modified font set.

9. The method of claim 7, wherein the information identifying the adjustments is stored in short term computer memory storage and the first and second instances are encountered when processing a single input file or multiple input files associated with a single project.

10. The method of claim 7, wherein the information identifying adjustments is stored in long term computer memory storage and the first and second instances relate to first and second input files processed for use in connection with the output device.

11. The method of claim 1, wherein the offset is applied to a rasterized version of the text.

12. The method of claim 1, further comprising receiving as a user input an identification of the selected part of the input file.

13. The method of claim 1, further comprising receiving the predetermined resolution limit as a user input.

14. The method of claim 13, wherein the predetermined resolution limit is a user-imposed limit.

15. The method of claim 13, wherein the predetermined resolution limit is defined by the output device having a lower resolution limit than a resolution limit of the input file.

16. The method of claim 1, wherein the selected part of the input file comprises a plurality of strokes, the one or more portions comprises fewer than all the plurality of strokes, and the step of automatically modifying comprises applying the offset to all of the plurality strokes.

17. The method of claim 1, wherein each of the identified one or more portions is disposed at an angle ($\beta$) relative to the lateral direction; and the offset is dependent upon $\beta$.

18. The method of claim 17, wherein the offset is equal to the initial thickness$+2*\text{sqrt}(D2 \sin 2(\alpha-\beta)+d2 \cos 2(\alpha-\beta))$.

19. A method for proofing at least a selected part of a graphical data input file for output to an output device, the method comprising automatically adjusting, using a computer programmed to perform such adjusting, at least one graphics feature in the input file to compensate for a predetermined resolution limit, the method comprising the steps of:
  (a) automatically identifying, using the computer, in the selected part of the input file, one or more portions having an initial thickness less than the predetermined resolution limit;
  (b) automatically determining a set of optimal anisotropic path offset parameters that when applied will bring the one or more portions above the predetermined resolution limit with a minimal total offset value;
  (c) automatically modifying with the computer the selected part of the input file so that the identified one or more portions have an adjusted thickness greater than the initial thickness, said modifying comprising applying an offset using the identified set of optimal anisotropic path offset parameters;
  (d) creating, using the computer, ab output file comprising the at least one graphics feature having the adjusted thickness; and
  wherein the step of automatically determining a set of optimal anisotropic offset parameters comprises analyzing the results of a skeletonization operation, the step of analyzing the results of the skeletonization operation comprising:
    (i) building a 2 dimensional histogram representing stroke direction divided into 180/n direction intervals of n degrees each, and k weight intervals equally divided in a range between 0 and the predetermined resolution limit, with a value of each cell in the interval comprising a total stroke length for the identified part of the file having the stroke direction and weight defined by the cell, and
    (ii) iteratively testing a plurality of offset conditions until a total stroke length represented by a sum of all cells in the histogram is less than or equal to a predetermined percentage of a total stroke length of all strokes in the identified part.

20. The method of claim 19, wherein the step of applying an offset using the identified set of optimal anisotropic path offset parameters can be expressed as applying one or more ellipses to the selected part of the input file, each of the one or more ellipses having an offset distance (D) in a major diameter direction, another offset distance (d) in a minor diameter direction that is perpendicular to the major diameter direction, and an angle (a) of the major diameter direction relative to a lateral direction, wherein D>d.

21. A system for proofing at least a selected part of a graphical data input file for output to an output device, the system configured for automatically adjusting at least one graphics feature to compensate for a predetermined resolution limit, the system comprising a controller comprising a processor having a memory programmed with instructions for performing the method steps of:
  (a) automatically identifying, using the controller, one or more portions of the selected part of the input file that have an initial thickness less than the predetermined resolution limit;
  (b) automatically determining a set of optimal anisotropic path offset parameters that when applied will bring at least a selected percentage of the one or more portions above the predetermined resolution limit with a minimal total offset value;
  (c) automatically modifying with the controller the selected part of the input file so that the identified one or more portions have an adjusted thickness greater than the initial thickness, said modifying comprising applying an offset using the identified set of anisotropic path offset parameters;
  (d) creating, using the controller, an output file comprising the at least one graphics feature having the adjusted thickness;
  wherein the step of applying an offset using the identified set of optimal anisotropic path offset parameters can be expressed as applying one or more ellipses to the selected part of the input file, each of the one or more ellipses having an offset distance (D) in a major diameter direction, another offset distance (d) in a minor diameter direction that is perpendicular to the major diameter direction, and an angle (a) of the major diameter direction relative to a lateral direction, wherein D>d.

22. The system of claim 21, further comprising the output device, wherein the output device comprises a printer, a printing plate maker, or a cutter connected to the controller.

23. A non-transitory computer readable media including program instructions for proofing at least a selected part of a graphical data input file for output to an output device, the instructions programmed for automatically adjusting at least one graphics feature in the input file to compensate for a predetermined resolution limit, said program instructions when executed by a processor for causing the processor to perform the steps of:
  (a) automatically identifying, using the processor, one or more portions of the selected part of the input file having an initial thickness less than the predetermined resolution limit;
  (b) automatically determining a set of optimal anisotropic path offset parameters that when applied will bring at least a selected percentage of the one or more portions above the predetermined resolution limit with a minimal total offset value;
  (c) automatically modifying with the processor the selected part of the input file so that the identified one or more portions have an adjusted thickness greater than the initial thickness, said modifying comprising applying an offset using the identified set of anisotropic path offset parameters;
  (d) creating, using the processor, an output file comprising the at least one graphics feature having the adjusted thickness; and
wherein the step of applying an offset using the identified set of optimal anisotropic path offset parameters can be expressed as applying one or more ellipses to the selected part of the input file, each of the one or more ellipses having an offset distance (D) in a major diameter direction, another offset distance (d) in a minor diameter direction that is perpendicular to the major diameter, and an angle (a) of the major diameter direction relative to a lateral direction, wherein D>d.

* * * * *